United States Patent [19]

Moens et al.

[11] Patent Number: 5,639,560

[45] Date of Patent: Jun. 17, 1997

[54] POWDER COMPOSITION OF CRYSTALLINE POLYESTERS CONTAINING END METHACRYLYL GROUPS

[75] Inventors: Luc Moens, Sint-Genesius-Rode; Jean-Marie Loutz; Daniel Maetens, both of Brussels; Patrick Loosen, Mechelen; Marc Van Kerckhove, Nil-Saint-Vincent, all of Belgium

[73] Assignee: U C B S.A., Brussels, Belgium

[21] Appl. No.: 635,573

[22] Filed: Apr. 22, 1996

[30] Foreign Application Priority Data

Apr. 26, 1995 [GB] United Kingdom ............... 9508458

[51] Int. Cl.$^6$ ............................................. C08L 67/07
[52] U.S. Cl. ........................ 428/482; 522/104; 522/108; 525/10; 525/921; 525/934
[58] Field of Search ................... 525/10, 921, 934; 522/104, 108; 428/482

[56] References Cited

U.S. PATENT DOCUMENTS

| | | | |
|---|---|---|---|
| 3,485,732 | 12/1969 | D'Alelio | 204/159.15 |
| 4,158,618 | 6/1979 | Pastor | 204/159 |
| 4,352,924 | 10/1982 | Wooten | 528/302 |
| 4,370,387 | 1/1983 | Ueno et al. | 428/458 |
| 4,387,214 | 6/1983 | Passmore | 528/296 |
| 4,937,288 | 6/1990 | Pettit | 525/176 |
| 4,973,646 | 11/1990 | Witzeman | 428/45 |
| 4,983,712 | 1/1991 | Meixner | 528/272 |

FOREIGN PATENT DOCUMENTS 0624609  11/1994  European Pat. Off. .

*Primary Examiner*—Patricia A. Short
*Attorney, Agent, or Firm*—Wenderoth, Lind & Ponack

[57] ABSTRACT

A radiation-curable powder composition for use as varnish or paint which comprises at least one crystalline polyester containing end methacrylyl groups comprising the reaction products of glycidyl methacrylate and of a crystalline polyester containing end carboxyl groups is described. The said crystalline polyester containing end carboxyl groups is either (a) a polyester which is the reaction product of
  (1) an acid constituent which contains (a.1.1) 85 to 100 mol % of terephthalic acid or of 1,4-cyclohexanedicarboxylic acid and (a.1.2) 0 to 15 mol % of at least one other aliphatic, cycloaliphatic or aromatic di- or polycarboxylic acid having from 4 to 14 carbon atoms, and
  (2) an alcohol constituent which contains (a.2.1) 85 to 100 mol % of a saturated, straight-chain, aliphatic diol having from 2 to 12 carbon atoms and (a.2.2) 0 to 15 mol % of at least one other aliphatic or cycloaliphatic di- or polyol having from 2 to 15 carbon atoms; or (b) a polyester which is the reaction product of
  (1) an acid constituent which contains (b.1.1) 85 to 100 mol % of a saturated, straight-chain, aliphatic dicarboxylic acid having from 4 to 14 carbon atoms and (b.1.2) 0 to 15 mol % of at least one other aliphatic, cycloaliphatic or aromatic di- or polycarboxylic acid having from 4 to 14 carbon atoms, and
  (2) an alcohol constituent which contains (b.2.1) 85 to 100 mol % of 1,4-cyclohexanediol, of 1,4-cyclohexanedimethanol or of ethylene glycol and (b.2.2) 0 to 15 mol % of at least one other aliphatic or cycloaliphatic di- or polyol having from 2 to 15 carbon atoms.

24 Claims, No Drawings

POWDER COMPOSITION OF CRYSTALLINE POLYESTERS CONTAINING END METHACRYLYL GROUPS

DESCRIPTION

The present invention relates to novel radiation-curable powder compositions comprising at least one crystalline polyester containing end methacrylyl groups and optionally one ethylenically unsaturated oligomer, as well as to the preparation and to the uses of the said compositions.

More particularly, the present invention relates to powder compositions curable by ultraviolet irradiation or by accelerated electron bees, the binder of which is composed essentially of at least one crystalline polyester containing end methacrylyl groups, and which lend themselves to the production of paint and varnish coatings exhibiting a unique array of properties, inter alia excellent hardness, excellent mechanical properties and notable resistance to solvents.

Heat-curable powder compositions are well known in the art and are widely used as paints and varnishes for coating the most diverse objects. The advantages of these powders are manifold; on the one hand, problems due to solvents are completely eliminated and, on the other hand, the powders are 100% used, insofar as only the powder in direct contact with the substrate is retained by the latter, the excess powder being, in principle, fully recoverable and reusable. This is why these powder compositions are preferred with respect to coating compositions which are provided in the form of solutions in an organic solvent.

Heat-curable powder compositions have already found a wide outlet in the coating of domestic electrical appliances, automobile industry accessories, metal furniture, and the like. They generally contain heat-curable organic compounds which constitute the binder for the paint, fillers, pigments, catalysts and various additives for adapting their behaviour to their use.

Different types of heat-curable powder compositions exist. The most well known compositions contain, as binder, either a mixture of polyesters containing carboxyl groups with epoxide-containing compounds, such as triglycidyl isocyanurate, or β-hydroxyalkylamides, or alternatively a mixture of polyesters containing hydroxyl groups with isocyanates, which are or are not blocked, glycolurile or melamine resins, polycarboxylic acid anhydrides, and the like.

Polyesters containing carboxyl groups or hydroxyl groups which can be used for the preparation of powder varnishes and paints have already formed the subject of numerous publications. These polyesters are usually prepared from aromatic polycarboxylic acids, mainly terephthalic and isophthalic acid, and optionally a small proportion of aliphatic or cycloaliphatic dicarboxylic acids, and from various aliphatic polyols such as, for example, ethylene glycol, diethylene glycol, neopentyl glycol, 1,6-hexanediol, trimethylolpropane, and the like. These polyesters based on aromatic dicarboxylic acids, when they are used with an appropriate crosslinking agent, provide heat-curable compositions giving paint and varnish coatings possessing good properties, both as regards their appearance and as regards their mechanical properties (impact resistance, flexibility).

Currently, the great majority of polyesters used in heat-curable powder compositions are amorphous polyesters. Now, when the polyester is amorphous, it is difficult to prepare perfect heat-curable pulverulent compositions because they have to meet often contradictory criteria. Thus, these powders may not reagglomerate during their handling, their transportation and their storage, which implies that the amorphous polyester must possess a sufficiently high glass transition temperature (Tg). On the other hand, in order for the powder particles to be able to coalesce and to form a perfectly homogeneous and uniform coating, it is necessary that the glass transition temperature (Tg) of the polyester is sufficiently low to ensure a low viscosity in the molten state which, itself, ensures good wetting of the pigments and other solid materials accompanying the polyester in the formulation of the said heat-curable powder compositions.

Moreover, the powder must be capable of melting at the stoving temperature in order to form an even film before the crosslinking reaction begins which results in the final curing. In order to obtain good spreading of the molten film over the surface of the substrate, it is therefore necessary for the viscosity of the polyester in the molten state to be sufficiently low. In fact, a very high viscosity in the molten state prevents good spreading of the molten film and is reflected by a loss in the evenness and in the gloss of the coating. Finally, the rate of the crosslinking reaction of the composition can only be controlled by varying the amount and/or the nature of the crosslinking agent and of the crosslinking catalyst which is optionally used. Taking into account all the preceding requirements, it is generally allowed that a suitable amorphous polyester must exhibit a glass transition temperature (Tg) which is greater than 40° C. but less than 85° C. and a viscosity in the molten state of between 100 and 10,000 mPa.s, measured at a temperature of 200° C. on a cone/plate viscometer according to ASTM standard D 4287-88.

For all these reasons, it is not generally recommended to produce coatings from compositions based on such amorphous polyesters by stoving at temperatures below 160° C. for a time of approximately 10 to 20 minutes. In fact, at lower stoving temperatures, coatings of poorer quality having unsatisfactory physical properties are generally obtained. Moreover, the difficulty which is encountered in the adjustment of a glass transition temperature (Tg) which is sufficiently high, in order to eliminate the tendency towards reagglomeration during storage, constitutes a lack of flexibility for the user of the powder.

In order to solve these problems, heat-curable powder compositions have more recently been proposed in which the binder is composed of a crystalline polyester containing carboxyl groups or hydroxyl groups. In fact, the properties of crystalline polyesters make it possible to overcome, to a large extent, the disadvantages described above which are brought about by the adjustment of the glass transition temperature (Tg), of the viscosity in the molten state and of the reactivity of the amorphous polyesters.

Crystalline polyesters have a melting point greater than 40° C. and, if appropriate, a low glass transition temperature (Tg). This has the consequence that the viscosity in the molten state of crystalline polyesters is much less than that of amorphous polyesters of comparable molecular weight commonly used in heat-curable powder compositions. This means that powder coating compositions based on crystalline polyesters exhibit a better fluidity of the coating film in the molten state, which gives heat-cured coatings exhibiting an improved appearance.

In addition, by virtue of the crystallinity of the polyesters, the powders formulated with an appropriate crosslinking agent exhibit very good stability towards intermediate storage. Moreover, these crystalline polyesters allow the formation and the stoving of coatings at lower temperatures of the order of 90° to 150° C. (instead of 160° to 200° C.). Finally, compared with amorphous polyesters, crystalline polyesters provide coatings having better mechanical properties, in particular excellent flexibility.

Heat-curable compositions based on crystalline polyesters have already formed the subject of a certain number of publications in the form of papers and patents. In the patent literature, mention will in particular be made of International Patent Application PCT WO 91/14745, European Patent Application 70,118 and U.S. Pat. Nos. 4,352,924, 4,387,214, 4,937,288 and 4,973,646.

Crystalline polyesters and the heat-curable powder compositions prepared from these crystalline polyesters therefore possess, on the whole, properties which are more advantageous than those of amorphous polyesters. However, in spite of their advantageous properties, crystalline polyesters which have been able to find, as sole polymers, an advantageous commercial application are rare. Most often, these crystalline polyesters are used as an additional component for modifying commercially available conventional amorphous polyesters.

The reason for this situation is that crystalline polyesters of the state of the art also exhibit major disadvantages on a technical scale.

In the first place, the coatings obtained from known crystalline polyesters exhibit a low surface hardness (HB pencil hardness). This defect of crystalline polyesters greatly restricts the technical applications of the compositions containing these polyesters.

In the second place, in order to be curable under the effect of heat at low temperature, conventional polyesters require the presence of a crosslinking agent (epoxide-containing compounds, β-hydroxyalkylamides, and the like) and of a catalyst. Now, for the preparation of the powder, the crystalline polyester must be melted with the crosslinking agent, the catalyst and the other additives in an extruder at a temperature equal to or greater than the melting temperature of the crystalline polyester. It follows that, without specific precautions, an undesirable premature crosslinking of the binder, by reaction between the polyester and the crosslinking agent, already takes place during the preparation of the powder. A powder thus prepared produces defective coatings because of the presence of gelled particles and because, at the time when the molten film has to be spread over the surface of the substrate to be coated, instead of decreasing under the effect of heat, its viscosity increases too rapidly to obtain good spreading, which results in malformations of the coating obtained, such as gel and orange peel.

In addition, premature crosslinking of the binder can, without specific precautions, cause blocking of the extruder, which presents a not insignificant and very real danger.

In the third place, heat-curable powder compositions prepared from currently known crystalline polyesters give coatings where the resistance to weathering leaves something to be desired.

Attempts have already been made to develop binders for the manufacture of powder varnishes and paints which do not require the presence of a crosslinking agent; they are binders which are curable by ultraviolet irradiation or by accelerated electron beams.

U.S. Pat. No. 3,974,303 describes such compositions containing, as binders, very diverse thermoplastic resins. However, the sole polyester described in this patent (Example 3) is an amorphous polyester which has a glass transition temperature below room temperature (2.5° C.). The compositions prepared from this polyester consequently do not exhibit the least stability on storage and are of no practical use.

Consequently, it is highly desirable to be able to have available novel binders for the manufacture of powder compositions which can be cured by ultraviolet irradiation or by accelerated electron beams and which no longer exhibit the disadvantages recalled above. Such binders should make it possible to prepare powder compositions which are curable at low temperatures, which exhibit good stability on storage and which ensure, at the same time, the production of paint or varnish coatings possessing excellent properties, in particular as regards the fluidity in the molten state, the surface appearance, the surface hardness, the mechanical properties, the resistance to solvents and the resistance to weathering.

The surprising discovery has now been made that this objective is achieved when, for the preparation of radiation-curable powder compositions, use is made, as binders, of crystalline polyesters containing end methacrylyl groups, prepared from glycidyl methacrylate and from crystalline polyesters, themselves prepared from specific acid and alcohol constituents.

An object of the present invention is therefore novel radiation-curable powder compositions comprising at least one crystalline polyester containing end methacrylyl groups comprising the reaction products of glycidyl methacrylate and of a crystalline polyester containing end carboxyl groups, the said crystalline polyester containing end carboxyl groups being chosen from (a) a polyester which is the reaction product of
  (1) an acid constituent which contains (a.1.1) 85 to 100 mol % of terephthalic acid or of 1,4-cyclohexanedicarboxylic acid and (a.1.2) 0 to 15 mol % of at least one other aliphatic, cycloaliphatic or aromatic di- or polycarboxylic acid having from 4 to 14 carbon atoms; and
  (2) an alcohol constituent which contains (a.2.1) 85 to 100 mol % of a saturated, straight-chain, aliphatic diol having from 2 to 12 carbon atoms and (a.2.2) 0 to 15 mol % of at least one other aliphatic or cycloaliphatic di- or polyol having from 2 to 15 carbon atoms; and (b) a polyester which is the reaction product of
  (1) an acid constituent which contains (b.1.1) 85 to 100 mol % of a saturated, straight-chain, aliphatic dicarboxylic acid having from 4 to 14 carbon atoms and (b.1.2) 0 to 15 mol % of at least one other aliphatic, cycloaliphatic or aromatic di- or polycarboxylic acid having from 4 to 14 carbon atoms, and
  (2) an alcohol constituent which contains (b.2.1) 85 to 100 mol % of 1,4-cyclohexanediol, of 1,4-cyclohexanedimethanol or of ethylene glycol and (b.2.2) 0 to 15 mol % of at least one other aliphatic or cycloaliphatic di- or polyol having from 2 to 15 carbon atoms.

The crystalline polyesters containing end methacrylyl groups incorporated in the compositions in accordance with the present invention exhibit a degree of end unsaturation of 0.18 to 1.8, preferably of 0.35 to 1.25, milliequivalents of double bonds per gram of polyester.

The crystalline polyesters containing end methacrylyl groups incorporated in the compositions in accordance with the present invention additionally exhibit the following characteristics:

a number-average molecular weight of between 1,000 and 21,000, preferably between 1,300 and 9,000, measured by gel permeation chromatography (or GPC), a well-defined melting point of approximately 60° to 150° C., determined by differential scanning calorimetry (or DSC) according to ASTM standard D 3418-82, a viscosity in the molten state of less than 10,000 mPa.s, measured at 175° C. with a cone/plate viscometer (known under the name of "ICI viscosity") according to ASTM standard D 4287-88.

The acid constituent of the crystalline polyester (a) containing end carboxyl groups contains from 85 to 100 mol % of terephthalic acid or of 1,4-cyclohexanedicarboxylic acid and optionally up to 15 mol % of one or a number of other aliphatic, cycloaliphatic or aromatic di- or polycarboxylic acids having from 4 to 14 carbon atoms, such as maleic acid, rumeric acid, isophthalic acid, terephthalic acid, 1,2-cyclohexanedicarboxylic acid, 1,3-cyclohexanedicarboxylic acid, 1,4-cyclohexanedicarboxylic acid, succinic acid, gluteric acid, adipic acid, pimelic acid, suberic acid, azelaic acid and sebacic acid. These acids can be used in the form of the free acid or of their functional derivatives, in particular in the form of the anhydride. The use of a polycarboxylic acid (or its anhydride) containing at least three carboxyl groups, for example trimellitic acid (or the anhydride) or pyromellitic acid, makes possible the preparation of branched polyesters. In addition, these di- or polycarboxylic acids can be used alone or as a mixture but they are preferably used alone.

The alcohol constituent of the crystalline polyester (a) containing end carboxyl groups contains from 85 to 100 mol % of a saturated, straight-chain, aliphatic diol having from 2 to 12 carbon atoms. Examples of diols which can be used are ethylene glycol, 1,4-butanediol, 1,5-pentanediol and 1,6-hexanediol. The alcohol constituent of the crystalline polyester (a) containing end carboxyl groups can also contain up to 15 mol % of one or a number of other aliphatic or cycloaliphatic di- or polyols having from 2 to 15 carbon atoms, such as for example 1,4-cyclohexanediol, 1,4-cyclohexanedimethanol or hydrogenated bisphenol A. For the preparation of branched polyesters, use is advantageously made of trihydroxylated or tetrahydroxylated polyols, such as trimethylolpropane, ditrimethylolpropane, trimethylolethane or pentaerythritol and their mixtures.

The acid constituent of the crystalline polyester (b) containing end carboxyl groups contains from 85 to 100 mol % of a saturated, straight-chain, aliphatic dicarboxylic acid having from 4 to 14 carbon atoms. Examples of the acids which can be used are succinic acid, glutaric acid, adipic acid, pimelic acid, suberic acid, azelaic acid, sebacic acid, 1,12-dodecanedioic acid, and the like. These acids can be used in the form of free acids or of their functional derivatives, in particular in the form of anhydrides. In addition, these acids can be used alone or as a mixture but they are preferably used alone. Among these acids, adipic acid is preferably used.

The acid constituent of the crystalline polyester (b) containing end carboxyl groups can also contain up to 15 mol % of one or a number of other aliphatic, cycloaliphatic or aromatic di- or polycarboxylic acids having from 4 to 14 carbon atoms, such as maleic acid, fumaric acid, terephthalic acid, isophthalic acid, 1,2-cyclohexanedicarboxylic acid, 1,3-cyclohexanedicarboxylic acid and 1,4-cyclohexanedicarboxylic acid. The use of a polycarboxylic acid (or its anhydride) containing at least three carboxyl groups, for example trimellitic acid (or the anhydride) or pyromellitic acid, makes possible the preparation of branched polyesters. In addition, these di- or polycarboxylic acids can be used alone or as a mixture but they are preferably used alone.

The alcohol constituent of the crystalline polyester (b) containing end carboxyl groups contains from 85 to 100 mol % of 1,4-cyclohexanediol, of 1,4-cyclohexanedimethanol or of ethylene glycol. The alcohol constituent of the crystalline polyester (b) containing end carboxyl groups can also contain up to 15 mol % of one or a number of other aliphatic or cycloaliphatic di- or polyols such as ethylene glycol, propylene glycol, 1,4-butanediol, 1,5-pentanediol, 1,6-hexanediol, 1,4-cyclohexanediol, 1,4-cyclohexanedimethanol and hydrogenated bisphenol A. For the preparation of branched polyesters, use is advantageously made of trihydroxylated or tetrahydroxylated polyols, such as trimethylolpropane, ditrimethylolpropane, trimethylolethane or pentaerythritol and their mixtures.

An essential characteristic of the crystalline polyesters incorporated in the compositions in accordance with the present invention is that they are composed of chains which virtually all contain crosslinkable methacrylyl groups at each end of the chain.

It has in fact been observed that polyesters containing end methacrylyl groups provide compositions showing, under irradiation, a greater rate of curing than polyesters containing unsaturation introduced by compounds containing maleic or fumaric acid radicals.

Moreover, it has also been observed that the preparation of crystalline polyesters containing end acrylyl groups exhibits difficulties related to the thermal instability of the acrylyl group (risk of premature gelling) and that, in addition, such polyesters exhibit a reactivity in polymerization which is too high to make possible good application as a powder composition (see Comparative Example C3).

Another essential characteristic of the compositions according to the present invention lies in the crystalline nature of the polyesters containing end methacrylyl groups which are incorporated therein.

In order to be usable in powder compositions, the crystalline polyesters must necessarily correspond to the following requirements:

the polyesters must exhibit a sufficiently high degree of crystallinity; and the crystallization time must be sufficiently short.

In order to correspond to these requirements, it is necessary for the chain of the polyester to be as regular as possible. For this purpose, it is preferable for the acid and alcohol constituents entering into the composition of the crystalline polyester to be straight-chain symmetrical compounds, such as saturated, straight-chain, aliphatic diols and saturated, straight-chain dicarboxylic acids, and for these compounds to be used alone rather than as a mixture.

Moreover, it should be noted that the reaction with glycidyl methacrylate does not affect the crystalline nature of the polyester obtained.

In order to achieve the aims pursued by the present invention, it is therefore necessary in particular to make a judicious choice of the nature of the acid and alcohol constituents entering into the composition of the polyesters in order to provide the desired degree of crystallinity of the latter.

By virtue of their crystalline nature, the polyesters containing end methacrylyl groups which are incorporated in the powder compositions in accordance with the invention possess all the advantages of the known crystalline polyesters recalled above, namely a melting point which is greater than 40° C. and a viscosity in the molten state which is much lower than that of amorphous polyesters of comparable molecular weight, resulting in a better fluidity of the coating film in the molten state.

In addition, by virtue of the crystalline nature of the polyesters, the powders exhibit very good stability on storage and coatings can be obtained at low application temperatures of the order of 80° to 150° C. It is also obvious that the lowering of the application temperature is economically and technically advantageous, since it results in a saving in energy, on the one hand, and a more certain and more constant quality of the final coatings, on the other hand. Another not insignificant advantage is that it is possible to obtain coatings on substrates which are more sensitive to heat, such as, for example, wood and plastics, thus widening the field of application of this type of product.

However, with respect to known crystalline polyesters, which do not contain end methacrylyl groups, the crystalline polyesters containing end methacrylyl groups which are incorporated in the powder compositions in accordance with the invention also exhibit a series of additional, very important advantages.

As has already been explained in the introduction to the present specification, in order that they may be cured under the effect of heat at low temperature, known crystalline polyesters require the presence of a crosslinking agent and of a catalyst with, as a consequence, the formation of defective coatings (gelled particles and orange peel).

The essential advantage of the powder compositions comprising crystalline polyesters in accordance with the invention with respect to compositions comprising conventional polyesters is that they can be cured at low temperature, without either an additional crosslinking agent or a catalyst, by ultraviolet irradiation or by accelerated electron beams.

This makes it possible to overcome, to a large extent, the disadvantages described above which the presence of a crosslinking agent and of a catalyst introduces into the crosslinking and the curing under the effect of heat.

In fact, in view of the absence of crosslinking agent, any premature reaction with the latter is excluded during the preparation of the powder in the extruder and in particular at the time when the molten film has to be spread over the surface of the substrate to be coated. The viscosity which is suitable for providing perfect spreading of the molten film, given that the crosslinking which results in the curing of the molten film only begins at the time of the exposure of the latter to ultraviolet radiation or to accelerated electron beams, can consequently easily be obtained. These advantages are reflected in reality by the production of very taut coatings having a smooth appearance and without apparent defects.

Another advantage of the powder compositions comprising crystalline polyesters in accordance with the invention, as will be shown in the following examples, is that they provide, after curing by radiation, coatings which exhibit a much higher surface hardness than the powder compositions containing known crystalline polyesters cured under the effect of heat. This result is completely surprising.

Finally, a defect noticed in the majority of heat-curable powder compositions prepared from known crystalline polyesters is that the coatings prepared have a poor resistance to weathering.

In accordance with the present invention, by judiciously choosing the nature of the acid constituent and of the alcohol constituent of the crystalline polyester, it is possible to obtain powder compositions which give coatings which possess remarkable stability to light and to weathering. This is the case, for example, for the powder compositions prepared from full aliphatic crystalline polyesters of Examples 3, 8, 9 and 11 given hereinbelow.

The radiation-curable powder compositions in accordance with the invention and which comprise at least one crystalline polyester containing end methacrylyl groups, contain 40 to 100 parts by weight of crystalline polyester containing end methacrylyl groups per 100 parts of the composition. In addition to the crystalline polyester containing end methacrylyl groups, these compositions optionally contain an ethylenically unsaturated oligomer, a photoinitiator and the various additional substances conventionally used in the manufacture of powder paints and varnishes.

In order to prepare the crystalline polyesters containing end methacrylyl groups, the preparation is first carried out of a crystalline polyester containing end carboxyl groups, with a straight or branched chain, and the polyester containing end carboxyl groups thus prepared is then reacted with glycidyl methacrylate.

The crystalline polyester containing end carboxyl groups is prepared according to the conventional methods for the synthesis of polyesters by esterification in one or a number of steps.

If the crystalline polyester containing end carboxyl groups is obtained in one step, a stoichiometric excess of one or a number of appropriate di- or polycarboxylic acids and one or a number of appropriate diols or polyols are reacted together.

In order to obtain a crystalline polyester containing end carboxyl groups in two steps, a crystalline polyester containing end hydroxyl groups is first prepared from one or a number of appropriate di- or polycarboxylic acids and from a stoichiometric excess of one or a number of appropriate diols or polyols and the crystalline polyester containing end hydroxyl groups thus obtained is then esterified with one or a number of other appropriate di- or polycarboxylic acids in order to obtain a crystalline polyester containing end carboxyl groups.

For the preparation of the crystalline polyesters containing end carboxyl groups, use is generally made of a conventional reactor equipped with a stirrer, an inert gas (nitrogen) inlet, a distillation column connected to a water-cooled condenser and a thermometer connected to a thermoregulator.

The esterification conditions used for the preparation of these crystalline polyesters are conventional, namely that it is possible to use an ordinary esterification catalyst derived from tin, such as dibutyltin oxide, dibutyltin dilaurate or n-butyltin trioctanoate, or derived from titanium, such as tetrabutyl titanate, in the proportion of 0 to 1% by weight of the reactants, and optionally to add antioxidants, such as the phenol compounds IRGANOX 1010 (CIBA-GEIGY) or IONOL CP (SHELL), or stabilizers of phosphonite or phosphite type, such as tributyl phosphite or triphenyl phosphite, in the proportion of 0 to 1% by weight of the reactants.

The polyesterification is generally carried out at a temperature which is gradually increased from 130° C. to approximately 180° to 250° C., first at normal pressure and then under reduced pressure at the end of each step of the process, these conditions being maintained until a polyester is obtained which exhibits the desired hydroxyl number and/or acid number. The degree of esterification is monitored by determination of the amount of water formed during the reaction and of the properties of the polyester obtained, for example the hydroxyl number, the acid number, the molecular weight and/or the viscosity.

The crystalline polyesters containing carboxyl groups thus obtained exhibit the following characteristics:
 an acid number of 10 to 150 mg of KOH/g, preferably of 20 to 100 mg of KOH/g,
 a number-average molecular weight of between 800 and 20,000, preferably between 1,000 and 8,500,
 a well-defined melting point of approximately 60° to 150° C., determined by differential scanning calorimetry (or DSC) according to ASTM standard D 3418-82, a viscosity in the molten state of less than 10,000 mPa.s, measured at 175° C. with a cone/plate viscometer (known under the name of "ICI viscosity") according to ASTM standard D 4287-88, and a functionality which is, preferably, between 2 and 4.

The crystalline polyesters containing methacrylyl groups are prepared in the following way: on completion of the polycondensation, the polyester, in the molten state, which is found in the reactor described above is allowed to cool to a temperature of between 100° and 160° C. and the polymerization inhibitor and then, slowly, a substantially equivalent amount of glycidyl methacrylate are added thereto.

The operating conditions used for the preparation of the crystalline polyesters containing end methacrylyl groups are also conventional, namely that it is possible to use a catalyst for the acid/epoxy reaction, for example amine-containing derivatives, such as 2-phenylimidazoline, phosphines, such as triphenylphosphine, quaternary ammonium compounds, such as tetrapropylammonium chloride or tetrabutylammonium bromide, or phosphonium salts, such as ethyltriphenylposphonium bromide or benzyltriphenylphosphonium chloride, in the proportion of 0.01 to 1.0% by weight of the reactants, and to add radical polymerization inhibitors, such as phenothiazine, or an inhibitor of hydroquinone type, in the proportion of 0.01 to 1.0% by weight of the reactants.

The epoxidation reaction is generally carried out at a temperature of between 100° and 160° C. The degree of progression of the epoxidation reaction is monitored by determination of the properties of the polyester obtained, for example the hydroxyl number, the acid number, the degree of end unsaturation and/or the content of free glycidyl methacrylate.

The crystalline polyesters containing end methacrylyl groups described above are intended to be used as binders in the preparation of powder compositions curable by ultraviolet irradiation or by accelerated electron beams, it being possible for the said compositions to be used in particular as varnishes and paints which lend themselves to application according to the technique of deposition by means of a triboelectric or electrostatic spray gun or according to the technique of deposition in a fluidized bed.

This is why the present invention additionally relates to the use of the radiation-curable powder compositions in accordance with the invention for the preparation of powder varnish and paint, as well as to the powder varnish and paint obtained using these compositions.

Finally, the present invention also relates to a process for coating an article which is characterized by the application to the said article of a radiation-curable powder composition in accordance with the invention by deposition by spraying with a triboelectric or electrostatic gun or by deposition in a fluidized bed, followed by the melting of the coating thus obtained by heating at a temperature of 80° to 150° C. for a time of approximately 0.5 to 10 minutes and by the curing of the coating in the molten state by ultraviolet irradiation or by accelerated electron beams.

According to a preferred embodiment of the invention, the radiation-curable powder compositions additionally comprise an ethylenically unsaturated oligomer. Mention will be made, as examples of these ethylenically unsaturated oligomers, of the triacrylate and the trimethacrylate of tris(2-hydroxyethyl) isocyanurate, the epoxy acrylates and methacrylates which are formed by reaction of an epoxy compound (for example, the diglycidyl ether of bisphenol A) with acrylic or methacrylic acid, the urethane acrylates and methacrylates which are formed by reaction of an organic di- or polyisocyanate with a hydroxyalkyl acrylate or a hydroxyalkyl methacrylate and optionally a mono- and/or polyhydroxylated alcohol (for example, the reaction product of hydroxyethyl acrylate or methacrylate with toluenediisocyanate or isophoronediisocyanate), the acrylic acrylates or methacrylates, such as, for example, the reaction product of acrylic or methacrylic acid with a copolymer containing glycidyl groups obtained by copolymerization of acrylic monomers, such as n-butylmethacrylate and methyl methacrylate, with glycidyl acrylate or methacrylate, and the like. The triacrylate of tris(2-hydroxyethyl) isocyanurate is preferably used. As these ethylenically unsaturated oligomers contain polymerizable double bonds, they also participate in the radiation curing and can consequently provide coatings with a surface hardness which is further increased. Depending on the envisaged applications, the compositions in accordance with the invention contain 0 to 20, preferably 0 to 10, parts by weight of ethylenically unsaturated oligomer per 100 parts of composition in accordance with the invention.

For the radiation curing of the powder compositions in accordance with the invention with accelerated electron beams, it is not necessary to use a photoinitiator, seeing that this type of radiation provides by itself alone a production of free radicals which is sufficiently high for the curing to be extremely rapid. In contrast, when it concerns the photocuring of the powder compositions according to the invention with radiation where the wavelengths are between 200 and 600 nanometers (UV radiation), the presence of at least one photoinitiator is essential.

The photoinitiators which can be used according to the present invention are chosen from those commonly used for this purpose.

The appropriate photoinitiators which can be used are aromatic carbonyl compounds, such as benzophenone and its alkylated or halogenated derivatives, anthraquinone and its derivatives, thioxanthone and its derivatives, benzoin ethers, aromatic or non-aromatic alpha-diones, benzil dialkyl acetals, acetophenone derivatives and phosphine oxides.

Photoinitiators which may be suitable are, for example, 2,2'-diethoxyacetophenone, 2-, 3- or 4-bromoacetophenone, 2,3-pentanedione, hydroxycyclchexyl phenyl ketone, benzaldehyde, benzoin, benzophenone, 9,10-dibromoanthracene, 2-hydroxy-2-methyl-1-phenylpropan-1-one, 4,4'-dichlorobenzophenone, xanthone, thioxanthone, benzil dimethyl ketal, diphenyl(2,4,6-trimethylbenzyl) phosphine oxide, and the like. It may optionally be advantageous to use a photoactivator, such as tributylamine, 2-(2-aminoethylamino)ethanol, cyclohexylamine, diphenylamine, tribenzylamine or aminoacrylates such as, for example, the addition product of a secondary amine, such as dimethylamine, diethylamine, diethanolamine, and the like, with a polyol polyacrylate, such as the diacrylate of trimethylolpropane, of 1,6-hexenediol, and the like.

The powder compositions in accordance with the invention contain 0 to 15 and preferably 0.5 to 8 parts by weight of photoinitiators per 100 parts by weight of composition in accordance with the invention.

The radiation-curable powder compositions in accordance with the invention can also contain various additional substances conventionally used in the manufacture of powder paints and varnishes.

The additional substances optionally added to the radiation-curable powder compositions in accordance with the invention are, inter alia, compounds which absorb ultraviolet radiation, such as TINUVIN 900 (from CIBA-GEIGY Corp.), light stabilizers based on sterically hindered amines (for example TINUVIN 144 from CIBA-GEIGY Corp.), fluidity-regulating agents such as RESIFLOW PV5 (from WORLEE), MODAFLOW (from MONSANTO), ACRONAL 4F (from BASF) or CRYLCOAT 109 (from UCB), degassing agents such as benzoin, and the like.

A variety of pigments and inorganic fillers can also be added to the radiation-curable powder compositions in accordance with the invention. Mention will be made, as examples of pigments and fillers, of metal oxides, such as titanium dioxide, iron oxide, zinc oxide, and the like, metal hydroxides, metal powders, sulphides, sulphates, carbonates, silicates such as, for example, aluminium silicate, carbon black, talc, kaolins, barytas, iron blues, lead blues, organic reds, organic maroons, and the like.

These additional substances are used in the usual amounts, it being understood that if the radiation-curable compositions in accordance with the invention are used as varnishes, the addition of additional substances having opacifying properties will be omitted.

For the preparation of the radiation-curable powder compositions, the crystalline polyester containing end methacrylyl groups, the ethylenically unsaturated oligomer, if it is present, optionally the photoinitiator, and the various additional substances conventionally used for the manufacture of powder paints and varnishes are dry mixed, for example in a tumbling mixer. This mixture is then homogenized at a temperature lying within the range from 60° to 150° C. in an extruder, for example a Buss Kokneter single-screw extruder or a twin-screw extruder of WERNER-PFLEIDERER, APV-BAKER or PRISM type. The extrudate is then allowed to cool, is ground cryogenically using liquid nitrogen and is sieved in order to obtain a powder in which the size of the particles is between 10 and 150 micrometers.

Instead of the above method, it is also possible to dissolve the crystalline polyester containing end methacrylyl groups, the ethylenically unsaturated oligomer, if it is present, optionally the photoinitiator, and the various additional substances in a solvent such as dichloromethane, to grind in order to obtain a homogeneous suspension containing approximately 30% by weight of solid matter and subsequently to evaporate the solvent, for example by spray drying at a temperature of approximately 50° C., according to methods known per se.

The powder paints and varnishes thus obtained are entirely suitable for application to the article to be coated by conventional techniques, that is to say by the well-known technique of deposition in a fluidized bed or by application with a triboelectric or electrostatic spray gun.

After having been applied to the article concerned, the coatings deposited are heated in a forced circulation oven or by means of infrared lamps at a temperature of 80° to 150° C. for a time of approximately 0.5 to 10 minutes for the purpose of obtaining the melting and the spreading of the powder particles as a smooth, uniform and continuous coating at the surface of the said article. The molten coating is then cured by radiation, such as the ultraviolet light emitted, for example, by medium-pressure mercury vapour UV radiators, of at least 80 to 150 W/linear cm, or by any other well-known source of the state of the art, at a distance of approximately 5 to 20 cm and for a time of 1 to 60 seconds.

The molten coating can also be cured with accelerated electron beams of at least 150 KeV, the power of the devices employed being a direct function of the thickness of the composition layer to be cured by polymerization.

The radiation-curable powder compositions in accordance with the invention can be applied to the most diverse substrates, such as, for example, paper, cardboard, wood, textiles, metals of different nature, plastics, such as polycarbonates, poly(meth)acrylates, polyolefins, polystyrenes, poly(vinyl chloride)s, polyesters, polyurethanes, polyamides, copolymers such as acrylonitrile-butadiene-styrene (ABS) or cellulose acetate butyrate, and the like.

The examples which will follow illustrate the invention without limiting it. Except when otherwise indicated, the parts mentioned in the examples are parts by weight.

EXAMPLE 1

Synthesis of a crystalline polyester containing end methacrylyl groups in three steps.

1st step.

358.4 parts of 1,6-hexanediol, 10.4 parts of trimethylolpropane and 1.9 parts of n-butyltin trioctanoate, as catalyst, are introduced into a four-necked round-bottomed flask equipped with a stirrer, a distillation column connected to a water-cooled condenser, a nitrogen inlet pipe and a thermometer connected to a thermoregulator. The mixture is heated in a nitrogen atmosphere and with stirring to a temperature of approximately 140° C., 484.4 parts of terephthalic acid are then added, still with stirring, and the mixture is heated to a temperature of 190° C., at which the water formed begins to distil. The heating is then continued gradually until the mass reaches the temperature of 230° C. After approximately 95% of the theoretical amount of water formed has been collected, a transparent polyester is obtained.

The crystalline polyester containing end hydroxyl groups thus obtained exhibits the following characteristics:

| | |
|---|---|
| acid number | 9.5 mg of KOH/g |
| hydroxyl number | 42 mg of KOH/g |
| ICI viscosity at 175° C. | 700 mPa · s |

2nd step.

The polyester containing end hydroxyl groups obtained in the first step is allowed to cool to 200° C. and 75 parts of isophthalic acid are added thereto. The reaction mixture is then gradually heated to the temperature of 230° C. The reaction mixture is left at this temperature for approximately two hours, until the reaction mixture becomes transparent, and the pressure is then gradually decreased to 50 mm Hg. The reaction is then continued for 3 hours at 230° C. under reduced pressure.

The crystalline polyester containing end carboxyl groups thus obtained exhibits the following characteristics:

| | |
|---|---|
| acid number | 31 mg of KOH/g |
| hydroxyl number | 1 mg of KOH/g |
| ICI viscosity at 175° C. | 7,450 mPa · s |
| Mn (number-average molecular weight; GPC) | 4,550 |

3rd step.

The polyester containing end carboxyl groups obtained in the second step is allowed to cool to 150° C. and 0.4 part of di-tert-butylhydroquinone, as polymerization inhibitor, and 4.1 parts of ethyltriphenylphosphonium bromide, as catalyst, are added thereto. 62.2 parts of glycidyl methacrylate are then added thereto slowly in an oxygen atmosphere and with stirring. One hour after the addition has been completed, a crystalline polyester containing end methacrylyl groups is obtained which exhibits the following characteristics:

| acid number | 1.5 mg of KOH/g |
|---|---|
| hydroxyl number | 32 mg of KOH/g |
| content of unsaturation | 0.5 milliequivalent db/g |
| content of free glycidyl methacrylate | <0.1% by weight |
| ICI viscosity at 175° C. | 5,300 mPa · s |
| melting temperature (determined by differential scanning calorimetry (or DSC) with a rate of heating of 20° C. per minute) | 101° C. |
| $\overline{Mn}$ (GPC) | 4,890 |

EXAMPLE 2

Synthesis of a crystalline polyester containing end methacrylyl groups in two steps.

1st step.

502.3 parts of 1,4-cyclohexanedimethanol, 545.0 parts of adipic acid and 4.5 parts of dibutyltin oxide, as catalyst, are introduced into a four-necked round-bottomed flask equipped with a stirrer, a distillation column connected to a water-cooled condenser, a nitrogen inlet pipe and a thermometer connected to a thermo-regulator. The mixture is heated in a nitrogen atmosphere and with stirring to a temperature of approximately 140° C., at which the water formed begins to distill. The heating is then continued gradually until the reaction mass reaches the temperature of 220° C. When the distillation at atmospheric pressure stops, a vacuum of 50 mm Hg is gradually established. The reaction is then continued for 3 hours at 220° C. under a pressure of 50 mm Hg.

The crystalline polyester containing end carboxyl groups thus obtained exhibits the following characteristics:

| acid number | 30.5 mg of KOH/g |
|---|---|
| hydroxyl number | 2 mg of KOH/g |
| ICI viscosity at 175° C. | 3,500 mPa · s |
| $\overline{Mn}$ | 3,740 |

2nd step.

The procedure described in the third step of Example 1 is followed but the polyester containing end carboxyl groups obtained in the first step is allowed to cool beforehand to the temperature of 140° C., ethyltriphenylphosphonium bromide is replaced by benzyltriphenylphosphonium chloride and 70 parts of glycidyl methacrylate are used.

A crystalline polyester containing end methacrylyl groups is obtained which exhibits the following characteristics:

| acid number | 1.7 mg of KOH/g |
|---|---|
| hydroxyl number | 31 mg of KOH/g |
| content of unsaturation | 0.5 milliequivalent db/g |
| content of free glycidyl methacrylate | <0.1% by weight |
| ICI viscosity at 175° C. | 3,600 mPa · s |
| melting temperature (DSC; 20° C./min) | 80° C. |
| $\overline{Mn}$ (GPC) | 4,025 |

EXAMPLE 3

Synthesis of a crystalline polyester containing end methacrylyl groups in two steps.

1st step.

The procedure described in the first step of Example 2 is followed but the starting materials are replaced by 425.3 parts of 1,4-cyclohexanediol, 47.3 parts of hydrogenated bisphenol A, 23.6 parts of trimethylolpropane and 641 parts of adipic acid and use is made of 1.7 parts of n-butyltin trioctanoate as catalyst and of 0.5 part of tributyl phosphite as stabilizer.

The crystalline polyester containing end carboxyl groups thus obtained exhibits the following characteristics:

| acid number | 34 mg of KOH/g |
|---|---|
| hydroxyl number | 2 mg of KOH/g |
| ICI viscosity at 175° C. | 4,500 mPa · s |
| $\overline{Mn}$ | 5,610 |

2nd step.

The procedure described in the third step of Example 1 is followed but 75.0 parts of glycidyl methacrylate, 5.0 parts of n-butyltriphenylphosphonium bromide, as catalyst, and 0.3 part of phenothiazine, as polymerization inhibitor, are used.

A crystalline polyester containing end methacrylyl groups is obtained which exhibits the following characteristics:

| acid number | 1 mg of KOH/g |
|---|---|
| hydroxyl number | 33 mg of KOH/g |
| content of unsaturation | 0.5 milliequivalent db/g |
| content of free glycidyl methacrylate | <0.1% by weight |
| ICI viscosity at 175° C. | 4,000 mPa · s |
| melting temperature (DSC; 20° C./min) | 130° C. |
| $\overline{Mn}$ (GPC) | 6,040 |

EXAMPLES 4 TO 11

Eight other crystalline polyesters containing end methacrylyl groups in accordance with the invention were also prepared by following the procedure of Example 1 (Examples 4 to 6) or of Example 2 (Examples 7 to 11). However, it should be noted that, in Example 11, 0.9 part of tributyl phosphite is added as stabilizer. The nature and the amount (parts by weight) of the starting materials used, the amounts (parts by weight) of the esterification (n-butyltin trioctanoate) and epoxidation (ethyltriphenylphosphonium bromide) catalysts, the amounts (parts by weight) of radical polymerization inhibitor di-tert-butylhydroquinone), as well as the acid number ($N_{Ac}$ in mg of KOH/g) the hydroxyl number ($N_{OH}$ in mg of KOH/g), the ICI viscosity (in mPa.s) measured at the temperature indicated between brackets, and the number-average molecular weight ($\overline{Mn}$), determined by gel permeation chromatography (GPC), of the crystalline polyesters obtained after each step, as well as the content of unsaturation, expressed in milliequivalents of double bonds per g (abbreviated to meq db/g), the content of free glycidyl methacrylate (free GMA in % by weight), the ICI viscosity (in mPa.s), measured at the temperature indicated between brackets, the melting temperature (Tm in °C., determined by differential scanning calorimetry or DSC, 20° C./min) and the number-average molecular weight ($\overline{Mn}$), determined by GPC, of the crystalline polyester containing end methacrylyl groups obtained, are shown in Table I below.

In Table I, the different compounds used for the preparation of the crystalline polyesters according to the invention are denoted by the following abbreviations:

TPA: terephthalic acid
AdA: adipic acid
CHDA: 1,4-cyclohexanedicarboxylic acid
HD: 1,6-hexanediol
BD: 2,4-butanediol
CHDO: 1,4-cyclohexanediol
CHDM 1,4-cyclohexanedimethanol
TMP: trimethylolpropane
EG: ethylene glycol
DDA: 1,12-dodecanedioic acid
IPA: isophthalic acid
GMA: glycidyl methacrylate
EstCat: esterification catalyst (n-butyltin trioctanoate
EpCat: epoxidation catalyst (ethyltriphenylphosphonium bromide)
Inhib: radical polymerization inhibitor (di-tert-butylhydroquinone)

TABLE I

Examples of crystalline polyesters containing end methacrylyl groups

| Constituents (parts) | 4 | 5 | 6 | 7 | 8 | 9 | 10 | 11 |
|---|---|---|---|---|---|---|---|---|
| First step | | | | | | | | |
| TPA | 402.3 | 407.9 | 563.4 | | | | | |
| AdA | | | | | 612.3 | 608.0 | 530.3 | |
| CHDA | | | | 711.6 | | | | |
| HD | 345.3 | 311.3 | 429.9 | | | | | |
| BD | | | | 328.0 | | | | |
| CHDO | | | | | 429.5 | 455 | | |
| CHDM | | | | | | | 466.7 | |
| TMP | | 28.7 | | 22 | 22 | | | |
| EG | | | | | | | | 192.1 |
| DDA | | | | | | | | 803.3 |
| EstCat | 2 | 1.6 | 1.9 | 2.3 | 2.3 | 2.3 | 2.2 | 2.2 |
| $N_{Ac}$ (mg of KOH/g) | 5 | 3 | 5 | 29 | 32 | 35 | 54 | 56 |
| $N_{OH}$ (mg of KOH/g) | 85 | 87 | 124 | 1 | 5.5 | 2 | 2 | 2 |
| ICI Visc. | (150° C.) | (150° C.) | (150° C.) | (125° C.) | (150° C.) | (175° C.) | (125° C.) | (100° C.) |
| (mPa · s) | 400 | 850 | 150 | 7400 | 9100 | 1200 | 1000 | 300 |
| Mn (GPC) | 1320 | 1679 | 935 | 5610 | 5610 | 3740 | 2244 | 1930 |
| Second step (Examples 4 to 6) | | | | | | | | |
| IPA | 141.1 | 140.9 | | | | | | |
| AdA | | | 160 | | | | | |
| $N_{Ac}$ (mg of KOH/g) | 51 | 50 | 32 | | | | | |
| $N_{OH}$ (mg of KOH/g) | 3 | 0 | 2 | | | | | |
| ICI Visc. | (175° C.) | (175° C.) | (150° C.) | | | | | |
| (mPa · s) | 2100 | 7250 | 2350 | | | | | |
| Mn (GPC) | 2244 | 3237 | 3740 | | | | | |
| Third step (Examples 4 to 9) or Second step (Example 7 to 11) | | | | | | | | |
| EpCat | 3.9 | 3.4 | 4.6 | 4.6 | 4.6 | 4.6 | 4.4 | 5.6 |
| Inhib | 0.6 | 0.6 | 0.4 | 0.4 | 0.4 | 0.4 | 0.7 | 0.7 |
| GMA | 99.4 | 101.2 | 70.0 | 70.0 | 70.0 | 70.0 | 111.5 | 112.0 |
| $N_{Ac}$ (mg of KOH/g) | 1.6 | 2.1 | 7 | 3 | 2 | 1 | 1.4 | 1 |
| $N_{OH}$ (mg of KOH/g) | 52 | 50 | 30 | 28 | 30 | 32 | 45 | 54 |
| meq db/g | 0.8 | 0.8 | 0.5 | 0.5 | 0.5 | 0.5 | 0.8 | 0.8 |
| Free GMA (%) | <0.1 | <0.1 | <0.1 | <0.1 | <0.1 | <0.1 | <0.1 | <0.1 |
| ICI Visc. | (125° C.) | (175° C.) | (150° C.) | (125° C.) | (150° C.) | (150° C.) | (125° C.) | (100° C.) |
| (mPa · s) | 3400 | 4600 | 2450 | 3800 | 3600 | 4800 | 1300 | 200 |
| Tm (°C.) | 83 | 80 | 100 | 88 | 108 | 125 | 72 | 75 |
| Mn (GPC) | 2530 | 3650 | 4020 | 6040 | 6036 | 4024 | 2528 | 2220 |

EXAMPLE 12

Synthesis of a crystalline polyester containing end methacrylyl groups in three steps.

1st step.

The procedure described in the first step of Example 1 is followed but the starting materials are replaced by 453.7 parts of 1,6-hexanediol and 590.4 parts of terephthalic acid and use is made of 2.6 parts of n-butyltin trioctanoate as catalyst.

The polyester containing end hydroxyl groups thus obtained exhibits the following characteristics:

| | |
|---|---|
| acid number | 9 mg of KOH/g |
| hydroxyl number | 44 mg of KOH/g |
| ICI viscosity at 175° C. | 1,000 mPa · s |

2nd step.

The procedure described in the second step of Example 1 is followed but 91.8 parts of isophthalic acid are used.

The crystalline polyester containing end carboxyl groups thus obtained exhibits the following characteristics:

| | |
|---|---|
| acid number | 30 mg of KOH/g |
| hydroxyl number | 1 mg of KOH/g |
| ICI viscosity at 175° C. | 4,000 mPa · s |
| melting temperature (DSC; 20° C./min) | 130° C. |
| $\bar{M}n$ (GPC) | 3,740 |

3rd step.

The procedure described in the third step of Example 1 is followed but 65 parts of glycidyl methacrylate, 5 parts of ethyltriphenylphosphonium bromide, as catalyst, and 0.6 part of di-tert-butylhydroquinone, as polymerization inhibitor, are used.

A crystalline polyester containing end methacrylyl groups is obtained which exhibits the following characteristics:

| | |
|---|---|
| acid number | 1.3 mg of KOH/g |
| hydroxyl number | 30 mg of KOH/g |
| content of unsaturation | 0.5 milliequivalent db/g |
| content of free glycidyl methacrylate | <0.1% by weight |
| ICI viscosity at 175° C. | 3,300 mPa · s |
| melting temperature (DSC; 20° C./min) | 122° C. |
| $\bar{M}n$ (GPC) | 4,050 |

Two crystalline polyesters containing end carboxyl groups (C1 and C2), as well as a crystalline polyester containing end acrylyl groups (C3), which are introduced by way of comparison, were also prepared.

Example C1. (comparative)

Synthesis of a crystalline polyester containing end carboxyl groups in two steps.

The procedure described in Example 12 is followed but the preparation is halted after the crystalline polyester containing end carboxyl groups obtained in the second step is obtained and a further 5 parts of ethyltriphenylphosphonium bromide are added as crosslinking catalyst to the product obtained.

Example C2. (comparative)

Synthesis of a crystalline polyester containing end carboxyl groups in one step.

According to the procedure described in the first step of Example 2, 777.4 parts of 1,4-cyclohexanedicarboxylic acid, 366.8 parts of 1,4-butanediol and 2.5 parts of n-butyltin trioctanoate, as catalyst, are reacted.

The crystalline polyester containing end carboxyl groups thus obtained exhibits the following characteristics:

| | |
|---|---|
| acid number | 53 mg of KOH/g |
| hydroxyl number | 3 mg of KOH/g |
| ICI viscosity at 175° C. | 2,500 mPa · s |
| melting temperature (DSC; 20° C./min) | 70° C. |
| $\bar{M}n$ (GPC) | 2,240 |

5.5 parts of ethyltriphenylphosphonium bromide are also added to this polyester as crosslinking catalyst.

Example C3. (comparative)

Synthesis of a crystalline polyester containing end acrylyl groups in three steps.

The procedure described in Example 1 is followed but, in the third step, the 62.2 parts of glycidyl methacrylate are replaced by 56.0 parts of glycidyl acrylate.

A crystalline polyester containing end acrylyl groups is obtained which exhibits the following characteristics:

| | |
|---|---|
| acid number | 1.0 mg of KOH/g |
| hydroxyl number | 32 mg of KOH/g |
| content of unsaturation | 0.5 milliequivalent db/g |
| content of free glycidyl acrylate | <0.1% by weight |
| ICI viscosity at 175° C. | 16,000 mPa · s |
| melting temperature (DSC; 20° C./min) | 110° C. |
| $\bar{M}n$ (GPC) | 5,120 |

EXAMPLE 13

Preparation of radiation-curable powder coating compositions.

A series of powders, which can be used for the manufacture of coatings by spraying with the aid of an electrostatic spray gun, is prepared from the crystalline polyesters containing end methacrylyl groups in accordance with the invention obtained in Examples 1 to 12 and from the crystalline polyester containing end acrylyl groups not in accordance with the invention obtained in Example C3, the formulation of these powders being as follows:

A) Formulation based on the polyesters of Examples 1, 3, 5, 7, 11, 12 and C3:

| | |
|---|---|
| Polyester | 94.50 parts |
| Benzil dimethyl ketal (1) | 4.90 parts |
| Fluidity-regulating agent (5) | 0.25 part |
| Benzoin | 0.35 part |

B) Formulation based on the polyesters of Examples 2, 8 and 12:

| | |
|---|---|
| Polyester | 90.70 parts |
| Triacrylate of tris(2-hydroxyethyl) isocyanurate (3) | 3.80 parts |
| Benzil dimethyl ketal (1) | 4.90 parts |
| Fluidity-regulating agent (5) | 0.25 part |
| Benzoin | 0.35 part |

C) Formulation based on the polyesters of Examples 4, 10 and 12:

| | |
|---|---|
| Polyester | 88.8 parts |
| Triacrylate of tris(2-hydroxyethyl) isocyanurate (3) | 5.70 parts |
| Benzil dimethyl ketal (1) | 4.90 parts |
| Fluidity-regulating agent (5) | 0.25 part |
| Benzoin | 0.35 part |

D) Formulation based on the polyesters of Examples 6 and 9:

| | |
|---|---|
| Polyester | 72.6 parts |
| Triacrylate of tris(2-hydroxyethyl) isocyanurate (3) | 3.1 parts |
| Benzil dimethyl ketal (1) | 2.0 parts |
| Diphenyl(2,4,6-trimethylbenzoyl)phosphine | 1.0 part |

| oxide (2) | |
|---|---|
| Titanium dioxide (4) | 20.0 parts |
| Fluidity-regulating agent (6) | 1.0 part |
| Benzoin | 0.3 part |

E) Formulation based on the polyester of Example 2:

| Polyester | 99.40 parts |
|---|---|
| Fluidity-regulating agent (5) | 0.25 part |
| Benzoin | 0.35 part |

By way of comparison, a further three powders are prepared which can be used for the manufacture of coatings by spraying with the aid of an electrostatic spray gun, the formulation of these powders being as follows:

F) Formulation based on the crystalline polyester of Example C1:

| Polyester | 93.0 parts |
|---|---|
| Triglycidyl isocyanurate (7) | 7.00 parts |
| Fluidity-regulating agent (8) | 2.50 parts |
| Benzoin | 0.35 part |

G) Formulation based on the crystalline polyester of Example C1:

| Polyester | 55.1 parts |
|---|---|
| Triglycidyl isocyanurate (7) | 4.1 parts |
| Titanium dioxide (4) | 39.5 parts |
| Fluidity-regulating agent (6) | 1.0 part |
| Benzoin | 0.3 part |

H) Formulation based on the crystalline polyester of Example C2:

| Polyester | 89.5 parts |
|---|---|
| Triglycidyl isocyanurate (7) | 9.9 parts |
| Fluidity-regulating agent (5) | 0.3 part |
| Benzoin | 0.3 part |

(1) IRGACURE 651 (CIBA-GEIGY)

2) LUCIRIN TPO (BASF)

3) IRR 264 (UCB)

4) KRONOS CL 2310 (CIBA-GEIGY)

5) MODAFLOW 2000 (MONSANTO)

6) RESIFLOW PV5 (WORLEE CHEMIE)

7) ARALDITE PT810 (CIBA-GEIGY)

8) CRYLCOAT 109 (UCB)

These powder compositions are prepared by dry mixing the crystalline polyester, if appropriate, the photoinitiator and the ethylenically unsaturated oligomer, if it is present (or triglycidyl isocyanurate in the case of compositions given by way of comparison), with the various additional substances conventionally used for the manufacture of powder paints and varnishes. The mixture obtained is homogenized at a temperature of approximately 70° to 140° C. in an APV twin-screw extruder (from the company APV-BAKER) and the extrudate is cryogenically ground in a grinder of ALPINE 100UPZ type (from the company ALPINE) equipped with a liquid nitrogen inlet, so that the grinding temperature is maintained at −80° C. To complete, the powder is sieved in order to obtain a size of the particles of between 10 and 110 micrometers.

EXAMPLE 14

Characteristics of the coatings.

The powders formulated as described in Example 13 with the polyesters in accordance with the invention and with those given by way of comparison are applied, with an electrostatic spray gun at a voltage of 70 kV, to untreated cold-rolled steel panels as a film thickness of 20 to 60 micrometers. The coatings deposited are then subjected to melting (curing for the powders of Comparative Examples C1 and C2) in an air-ventilated oven, at a temperature indicated in Table II, for a time of approximately 5 minutes (15 minutes for the powders of Comparative Examples C1 and C2). The coatings in the molten state obtained with the powders in accordance with the invention and with the powder of the Comparative Example (C3) are then subjected either to irradiation with the ultraviolet light emitted by 100 W/cm medium-pressure mercury vapour UV lamps (DQ1023 from the company HERAEUS INSTRUMENTS GmbH), at a distance of 8 cm and for a time of 5 to 10 or 20 seconds, depending on whether the coating is intended to provide a transparent varnish (formulations A to C, F and H) or a paint (formulations D and G), or, under a nitrogen atmosphere, to an accelerated electron beam produced by a 170 KeV linear cathode (from the company Energy Sciences Inc.) at a dose of 4 Mrads (formulation E).

The cured coatings thus obtained are subjected to conventional tests. The results obtained are reported in Table II, in which the first column gives the number of the preparation example of the polyester used in the formulation tested, the second column, the type of formulation used, the third column, the stoving temperature in °C. (true temperature of the object to be coated), the fourth column, the value of the pencil hardness at an angle of 45°, with a force of 7.5 newtons, measured according to ASTM standard D3363-92A, the fifth column, the value of the resistance to direct impact, in kg.cm, according to ASTM standard D2795, the sixth column, the value of the resistance to reverse impact, in kg.cm, according to ASTM standard D2795, the seventh column, the value obtained in the Erichsen embossing test, according to ISO standard 1520, the eighth column, a visual assessment of the coating, according to which good means that the cured coating possesses a smooth and glossy appearance, without apparent defects such as craters, pinholes and the like, medium means that the cured coating exhibits a slight orange peel with a gloss, measured at an angle of 60°, which is less than 90% and poor means that the cured coating exhibits an orange peel appearance, a gloss, measured at an angle of 60°, which is less than 80% and, in addition, apparent defects and the ninth column, the resistance to methyl ethyl ketone, which corresponds to the number of twofold rubbing movements (to and fro) with a cotton pad impregnated with methyl ethyl ketone which does not detrimentally affect the appearance of the surface of the cured film.

TABLE II

Characteristics of the coatings.

| Polyester of Example | Formulation | Stoving temperature (°C.) | Pencil hardness | Direct impact (kg · cm) | Reverse impact (kg · cm) | Erichsen embossing (mm) | Appearance visual assessment | Methyl ethyl ketone rub test |
|---|---|---|---|---|---|---|---|---|
| 1 | A | 130 | H | 160 | 160 | 10.5 | good | >100 |
| 2 | B | 100 | 2H | 160 | 160 | 10.4 | good | >120 |
| 2 | E | 100 | H | 160 | 160 | 10.0 | good | >100 |
| 3 | A | 130 | 2H | 140 | 140 | 10.0 | medium | >150 |
| 4 | C | 100 | 2H | 160 | 140 | 10.2 | good | >150 |
| 5 | A | 100 | 3H | 120 | 100 | 9.6 | good | >150 |
| 6 | D | 130 | 2H | 140 | 140 | 9.8 | good | >140 |
| 7 | A | 100 | 2H | 140 | 140 | 9.5 | good | >180 |
| 8 | B | 130 | 3H | 140 | 120 | 9.5 | good | >180 |
| 9 | D | 130 | 2H | 120 | 100 | 10.1 | medium | >120 |
| 10 | C | 100 | 2H | 160 | 160 | 10.5 | good | >130 |
| 11 | A | 100 | H | 160 | 160 | 10.8 | good | >120 |
| 12 | A | 140 | 2H | 160 | 160 | 9.8 | good | >100 |
| 12 | B | 140 | 3H | 160 | 140 | 9.5 | good | >130 |
| 12 | C | 140 | 3H | 140 | 140 | 9.5 | good | >130 |
| C1 (1) | F | 140 | HB | 140 | 120 | 9.4 | poor | >80 |
| C1 (1) | G | 140 | HB | 140 | 120 | 9.4 | poor | >80 |
| C2 (1) | H | 140 | B | 140 | 140 | 9.6 | medium | >100 |
| C3 (1) | A | 130 | H | 140 | 120 | 10 | poor | >100 |

(1) by way of comparison

These results clearly show that the powder compositions in accordance with the invention based on crystalline polyesters containing end methacrylyl groups give paint and varnish coatings which possess advantageous characteristics markedly superior to those of the corresponding coatings obtained from the compositions of the state of the art. In fact, it is seen, for the compositions of the state of the art based on crystalline polyesters containing carboxyl groups (C1 and C2) and on a polyepoxidized compound as crosslinking agent (formulations F, Q and H, cured at a comparable temperature), that it is not possible to obtain coatings exhibiting an acceptable pencil hardness and an acceptable surface appearance. In contrast, the compositions in accordance with the invention obtained from the crystalline polyesters containing end methacrylyl groups provide coatings which exhibit a notable hardness, reaching a degree of hardness of 2H to 3H, and, in addition, an excellent surface appearance. On examination of the results from this table, it is also observed that the excellent properties of the compositions in accordance with the invention can be obtained at a lower temperature (100° to 130° C.).

Moreover, on comparing the characteristics of the coatings prepared from the crystalline polyesters 1 and C3, it is clearly seen that a powder composition composed of a crystalline polyester containing end acrylyl groups (C3) does not provide coatings which are as good as a powder composition in accordance with the invention composed of a crystalline polyester containing end methacrylyl groups, particularly as regards the resistance to impacts and the surface appearance. The very high viscosity of the crystalline polyester C3 (ICI viscosity at 175° C.: 16,000 mPa.s) clearly reflects the thermal instability of the crystalline polyesters containing end acrylyl groups, which begin to gel during their synthesis.

These results clearly show the superiority of the powder compositions in accordance with the invention with respect to the compositions of the state of the art.

What is claimed is:

1. A radiation-curable powder composition which comprises at least one crystalline polyester containing end methacrylyl groups comprising the reaction products of glycidyl methacrylate and of a crystalline polyester containing end carboxyl groups, the said crystalline polyester containing end carboxyl groups being selected from
   (a) a polyester which is the reaction product of
      (1) an acid constituent which contains (a.1.1) 85 to 100 mol % of terephthalic acid or of 1,4-cyclohexanedicarboxylic acid and (a.1.2) 0 to 15 mol % of at least one other aliphatic, cycloaliphatic or aromatic di- or polycarboxylic acid having from 4 to 14 carbon atoms, and
      (2) an alcohol constituent which contains (a.2.1) 85 to 100 mol % of a saturated, straight-chain, aliphatic diol having from 2 to 12 carbon atoms and (a.2.2) 0 to 15 mol % of at least one other aliphatic or cycloaliphatic di- or polyol having from 2 to 15 carbon atoms; and
   (b) a polyester which is the reaction product of
      (1) an acid constituent which contains (b.1.1) 85 to 100 mol % of a saturated, straight-chain, aliphatic dicarboxylic acid having from 4 to 14 carbon atoms and (b.1.2) 0 to 15 mol % of at least one other aliphatic, cycloaliphatic or aromatic di- or polycarboxylic acid having from 4 to 14 carbon atoms, and
      (2) an alcohol constituent which contains (b.2.1) 85 to 100 mol % of 1,4-cyclohexanediol, of 1,4-cyclohexanedimethanol or of ethylene glycol and (b.2.2) 0 to 15 mol % of at least one other aliphatic or cycloaliphatic di- or polyol having from 2 to 15 carbon atoms.

2. A powder composition according to claim 1, wherein the di- or polycarboxylic acid (a.1.2) is chosen from maleic acid, fumaric acid, isophthalic acid, terephthalic acid, 1,2-cyclohexanedicarboxylic acid, 1,3-cyclohexanedicarboxylic acid, 1,4-cyclohexanedicarboxylic acid, succinic acid, glutaric acid, adipic acid, pimelic acid, suberic acid, azelaic acid, sebacic acid, trimellitic acid, pyromellitic acid and their anhydrides, alone or as a mixture.

3. A powder composition according to claim 1, wherein the saturated, straight-chain, aliphatic diol (a.2.1) is chosen from ethylene glycol, 1,4-butanediol, 1,5-pentanediol and 1,6-hexanediol.

4. A powder composition according to claim 1, wherein the aliphatic or cycloaliphatic di- or polyol (a.2.2) is chosen from 1,4-cyclohexanediol, 1,4-cyclohexanedimethanol, hydrogenated bisphenol A, trimethylolpropane, ditrimethylolpropane, trimethylolethane, pentaerythritol and their mixtures.

5. A powder composition according to claim 1, wherein the saturated, straight-chain, aliphatic dicarboxylic acid (b.1.1) is chosen from succinic acid, gluteric acid, adipic acid, pimelic acid, suberic acid, azelaic acid, sebacic acid, 1,12-dodecanedioic acid and their anhydrides, alone or as a mixture.

6. A powder composition according to claim 5, wherein the saturated, straight-chain, aliphatic dicarboxylic acid (b.1.1) is adipic acid.

7. A powder composition according to claim 1, wherein the di- or polycarboxylic acid (b.1.2) is chosen from maleic acid, fumaric acid, terephthalic acid, isophthalic acid, 1,2-cyclohexanedicarboxylic acid, 1,3-cyclohexanedicarboxylic acid, 1,4-cyclohexanedicarboxylic acid, trimellitic acid, pyromellitic acid and their anhydrides, alone or as a mixture.

8. A powder composition according to claim 1, wherein the aliphatic or cycloaliphatic di- or polyol (b.2.2) is chosen from ethylene glycol, propylene glycol, 1,4-butanediol, 1,5-pentanediol, 1,6-hexanediol, 1,4-cyclohexanediol, 1,4-cyclohexanedimethanol, hydrogenated bisphenol A, trimethylolpropane, ditrimethylolpropane, trimethylolethane, pentaerythritol and their mixtures.

9. A powder composition according to claim 1, wherein the said at least one crystalline polyester containing end methacrylyl groups exhibits a degree of end unsaturation of 0.18 to 1.8 milliequivalents of double bonds per gram of polyester.

10. A powder composition according to claim 1, wherein the said at least one crystalline polyester containing end methacrylyl groups has a number-average molecular weight of between 1,000 and 21,000.

11. A powder composition according to claim 1, wherein the said at least one crystalline polyester containing end methacrylyl groups exhibits a viscosity in the molten state of less than 10,000 mPa.s, measured at 175° C. with a cone/plate viscometer.

12. A powder composition according to claim 1, wherein the said at least one crystalline polyester containing end methacrylyl groups exhibits a melting temperature of approximately 60° to 150° C.

13. A powder composition according to claim 1, which additionally comprises an ethylenically unsaturated oligomer.

14. A powder composition according to claim 13, wherein the ethylenically unsaturated oligomer is the triacrylate of tris(2-hydroxyethyl) isocyanurate.

15. A powder composition according to claim 13, wherein the ethylenically unsaturated oligomer is the trimethacrylate of tris(2-hydroxyethyl) isocyanurate.

16. A powder composition according to claim 1, which comprises, per 100 parts by weight, up to 20 parts by weight of the ethylenically unsaturated oligomer.

17. A powder composition curable by ultraviolet irradiation according to claim 1, which additionally comprises a photoinitiator and optionally a photoactivator.

18. A powder composition according to claim 17, which comprises, per 100 parts by weight, up to 15 parts by weight of photoinitiator.

19. A powder composition according to claim 18, which comprises, per 100 parts by weight, from 0.5 to 8 parts by weight of photoinitiator.

20. A powder varnish or paint curable by ultraviolet irradiation, obtained from a compositions according to claim 17.

21. An article coated entirely or partially with a varnish and/or a paint according to claim 20.

22. A powder varnish or paint curable by irradiation with an accelerated electron beam, obtained from a composition according to claim 1.

23. An article coated entirely or partially with a varnish and/or a paint according to claim 22.

24. A process for coating an article which comprises the steps of
i) applying a radiation-curable powder composition, which comprises at least one crystalline polyester containing end methacrylyl groups comprising the reaction products of glycidyl methacrylate and of a crystalline polyester containing end carboxyl groups, the said crystalline polyester containing end carboxyl groups being chosen from
(a) a polyester which is the reaction product of
(1) an acid constituent which contains (a.1.1) 85 to 100 mol % of terephthalic acid or of 1,4-cyclohexanedicarboxylic acid and (a.1.2) 0 to 15 mol % of at least one other aliphatic, cycloaliphatic or aromatic di- or polycarboxylic acid having from 4 to 14 carbon atoms, and
(2) an alcohol constituent which contains (a.2.1) 85 to 100 mol % of a saturated, straight-chain, aliphatic diol having from 2 to 12 carbon atoms and (a.2.2) 0 to 15 mol % of at least one other aliphatic or cycloaliphatic di- or polyol having from 2 to 15 carbon atoms; and
(b) a polyester which is the reaction product of
(1) an acid constituent which contains (b.1.1) 85 to 100 mol % of a saturated, straight-chain, aliphatic dicarboxylic acid having from 4 to 14 carbon atoms and (b.1.2) 0 to 15 mol % of at least one other aliphatic, cycloaliphatic or aromatic di- or polycarboxylic acid having from 4 to 14 carbon atoms, and
(2) an alcohol constituent which contains (b.2.1) 85 to 100 mol % of 1,4-cyclohexanediol, of 1,4-cyclohexanedimethanol or of ethylene glycol and (b.2.2) 0 to 15 mol % of at least one other aliphatic or cycloaliphatic di- or polyol having from 2 to 15 carbon atoms,
to the said article by deposition by spraying with a triboelectric or electrostatic spray gun or by deposition in a fluidized bed;
ii) heating the coating thus obtained at a temperature of 80° to 150° C. for a time of approximately 0.5 to 10 minutes so as to melt the said coating; and
iii) exposing the said coating in the molten state to ultraviolet radiation or to accelerated electron beams for a time which is sufficient fo form a cured coating.

* * * * *